Nov. 6, 1962    J. KINGSBURY ETAL    3,062,916
TELEVISION CAMERAS WITH LENSES OF VARIABLE FOCAL LENGTH
Filed Dec. 4, 1957    2 Sheets-Sheet 1
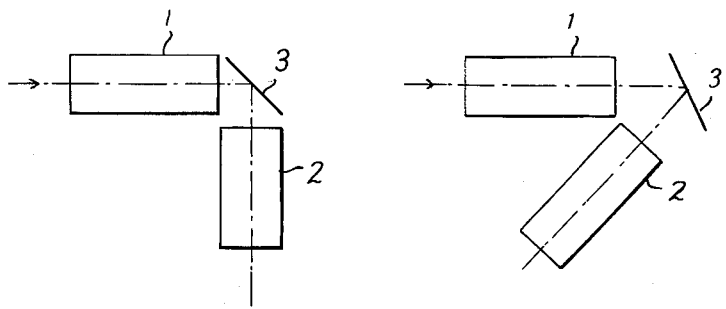
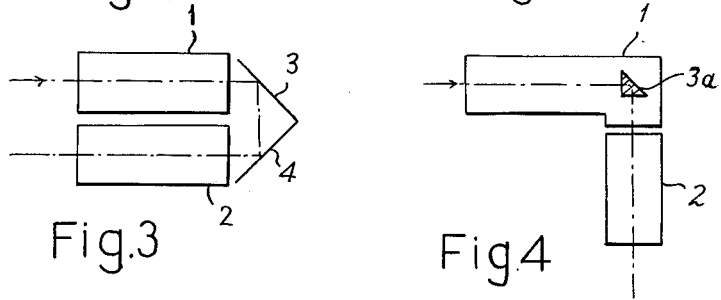
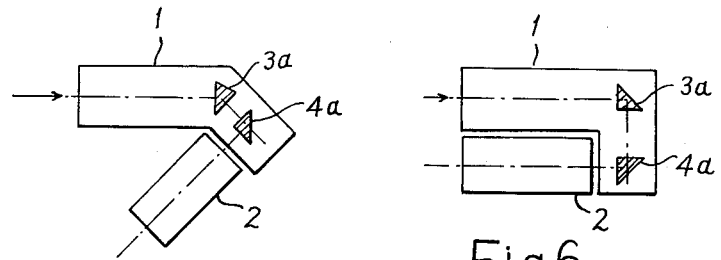
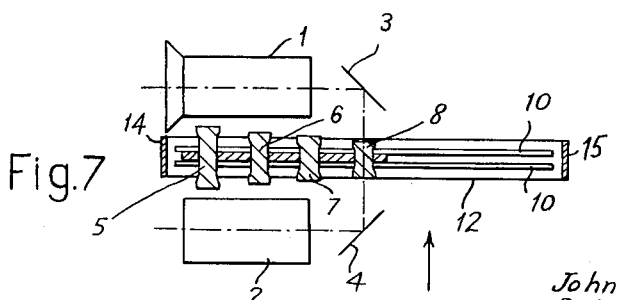
Inventors
John Kingsbury
Peter Bauer
By
Attorneys Nov. 6, 1962   J. KINGSBURY ETAL   3,062,916
TELEVISION CAMERAS WITH LENSES OF VARIABLE FOCAL LENGTH
Filed Dec. 4, 1957   2 Sheets-Sheet 2
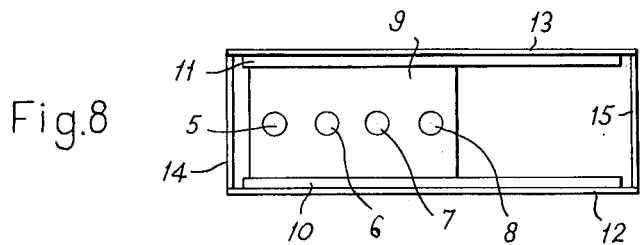
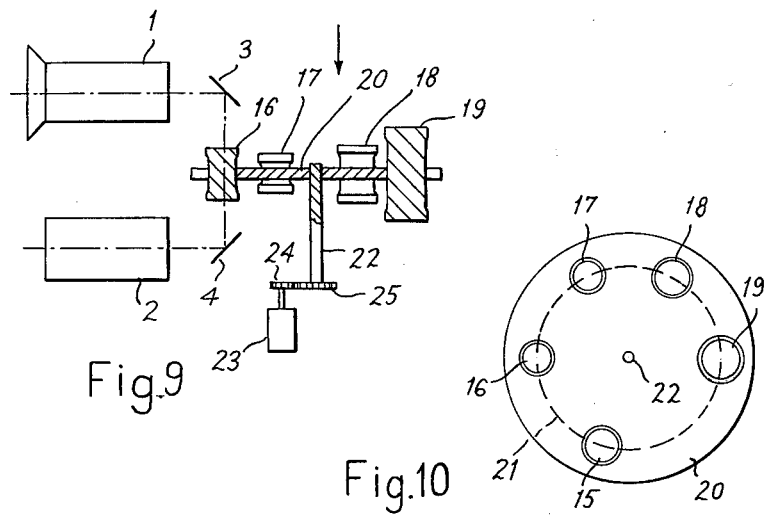
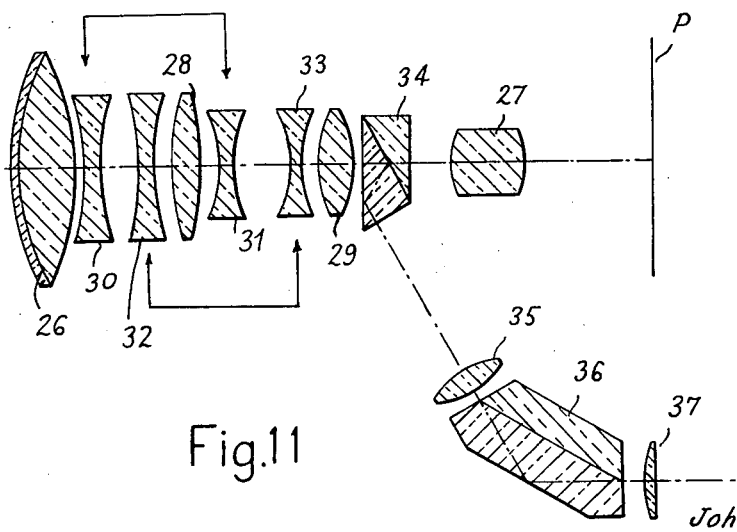
Inventors
John Kingsbury
Peter Bauer
By
Attorneys 3,062,916
TELEVISION CAMERAS WITH LENSES OF VARIABLE FOCAL LENGTH
John Kingsbury and Peter Bauer, Cambridge, England, assignors to Pye Limited, Cambridge, England, a British company
Filed Dec. 4, 1957, Ser. No. 700,640
Claims priority, application Great Britain Dec. 4, 1956
14 Claims. (Cl. 178—7.2)

The present invention relates to television cameras incorporating lenses of variable focal length commonly referred to in the art as "zoom lenses." Hereinafter for the sake of brevity and convenience such lenses will be referred to as "zoom lenses."

Until a short time ago all zoom lenses suffered from the disadvantage that the distance from the last component of the lens combination to the focal plane thereof was very short and thus to use these lenses with television cameras it was necessary to mount the pick-up tube behind the zoom lens along the optical axis thereof. This has the immediate drawback that the extended length of the lens and pick-up tube combination makes a television camera very clumsy and awkward in operation.

Comparatively recently a zoom lens has been introduced in which the distance between the penultimate lens component and the final component or between the final component and the focal plane of the lens combination is relatively large and the present invention is concerned more particularly with television cameras incorporating this kind of zoom lens.

It is a principal object of the invention to reduce the bulk of a television camera incorporating a zoom lens whereby the camera is made more handleable and convenient in use.

According to one feature of the invention there is provided an optical arrangement comprising a zoom lens and a television pick-up tube in which the lens is of the kind having a relatively long optical path between the penultimate and final component thereof or between the final component and the focal plane of the lens and in which the said pick-up tube is arranged off the optical axis of the lens, the image being transferred to the screen of the pick-up tube by a light-beam-bending means located along said relatively long axis.

The invention also provides a television camera incorporating an optical arrangement such as described above.

The light-beam-bending means referred to above may comprise one or more mirrors or prisms which may take any desired form.

One of the zoom lenses which is particularly suitable for putting the invention into effect is that lens known as the Pan-Cinor 4 Reflex, as is also the remaining known range of Pan-Cinor Reflex zoom lenses which are all basically of similar design.

These Pan-Cinor Reflex zoom lenses have a relatively long distance between the penultimate lens component and the final lens component of the lens combination. Such a lens is preferably modified in accordance with the invention so as to arrange a light reflecting prism or mirror in the light path along the optical axis between the penultimate and the final components of the lens combination. Such a combination may be referred to as folded zoom lens combination.

The pick-up tube may be located at right angles or at any acute angle to the optical axis of the zoom lens and a mirror or prism can be located to reflect the image through the necessary angle.

Alternatively the axis of the pick-up tube and the optical axis of the zoom lens may be parallel to each other and a double reflecting system used to transfer the image from the optical path of the zoom lens to that of the pick-up tube.

The objective elements will, generally speaking, be chosen so that there is no alteration in the distance between the objective element and the focussing screen of the camera tube. However, in certain circumstances there may be zoom lens combinations which would involve a change in this distance and in such an arrangement according to the invention the objective element may be replaceable together with one or more of the reflecting mirrors or prisms utilised to bend the light path.

One or more of the reflecting surfaces may be a dichroic mirror whereby the resultant combination will be much more compact than would be possible with a standard optical arrangement incorporating a zoom lens for a colour television camera.

In order that the invention may be more clearly understood reference will now be made to the accompanying drawings which show schematically a number of specific embodiments thereof by way of example and in which:

FIGS. 1 to 6 inclusive show arrangements of zoom lens and television pick-up tube in various forms, FIG. 7 shows an arrangement similar to FIG. 3 but with replaceable objectives for the zoom lens mounted on a slide, FIG. 8 shows an end view of the slide of FIG. 7 looking in the direction of the arrow in FIG. 7, FIG. 9 also shows an arrangement similar to FIG. 3 but with replaceable objectives for the zoom lens mounted in a turret, FIG. 10 shows an end view of the turret assembly of FIG. 9 looking in the direction of the arrow in FIG. 9, and FIG. 11 shows a diagram of the optical arrangements of a Pan-Cinor 4 Reflex zoom lens.

Referring to the drawings, it should be understood that these are purely schematic since the present invention is not concerned with the specific construction of the zoom lens or the pick-up tube used in the combination. Therefore, these units are shown in FIGS. 1 to 7 and 9 of the drawings only in block form.

The preferred lens arrangement which is utilised and adapted for the invention is one of the Pan-Cinor Reflex zoom lenses, manufactured by Som Berthiot of France. A particular example, the Pan-Cinor 4 Reflex zoom lens is diagrammatically shown in FIG. 11, in which there is a relatively long distance between the penultimate lens component and the final lens component. However, the combination of any other zoom lens having these features or in which there is a relatively long distance between the final lens component and the focal plane of the combination may be used as desired. It should also be clearly understood that in some of the figures of the drawings the normal final component of the lens combination has been omitted so as to simplify understanding of the invention and avoid confusion which might arise if irrelevant items were added since this final component in the unmodified Pan-Cinor Reflex zoom lens does not play any part in carrying the present invention into effect. The camera tube may take any form wellknown in the art and for a similar reason, therefore, has not been specifically shown.

FIG. 1 shows a zoom lens 1 and a camera tube 2 which are mounted in any convenient fashion at right angles to each other, the lens generally being fixed, a light-beam-bending device in the form of a mirror 3 being provided to transfer the image formed by the objective O of the zoom lens 1 onto the screen of pick-up tube 2.

It will be appreciated that the lens, beam-bending device and pick-up tube in all embodiments of the invention would in practice be housed within a casing together with a suitable viewfinder that generally comprises a monitoring cathode-ray tube, but this casing and viewfinder have been omitted as not being necessary for a proper understanding of the invention.

In FIG. 2 the camera tube is arranged at an acute angle to the zoom lens and in FIG 3 is arranged parallel thereto whereby it is necessary to provide a pair of light-beam-bending devices 3 and 4 which also may take the form of mirrors.

In some applications of zoom lens modified for the purposes of the invention, the light path may be bent within the lens mount itself, for example by means of prisms whereby the lens has a folded optical path internally as opposed to the external arrangements of FIGS. 1, 2 and 3. Arrangements employing folded internal optical paths are shown in FIGS. 4, 5 and 6, the camera tube 2 being at right angles to the lens in FIG. 4, being at an acute angle in FIG. 5 and being parallel to the main optical axis of the lens in FIG. 6. In FIGS. 4, 5 and 6 the light-beam-bending devices are shown in the form of prisms or the like at 3a and 4a. It will be understood that the prisms may be simple or compound prisms or may even be a train of prisms. Depending upon the considerations and optical angle involved one or more of the prism faces may have a reflective coating. Such light bending always occurs before the objective O in FIGURES 4, 5 and 6.

FIG. 11 shows a diagrammatic view of the optical arrangements of a Pan-Cinor 4 Reflex zoom lens which is the preferred lens forming the optical basis of the invention. The object lens is shown at 26 and may be in the form of an achromatic combination as shown. The final objective is shown at 27 and generally takes the form of a multiple lens combination but has been shown on the drawing in block form for convenience. The focal plane is shown at P. Such a zoom lens employs a system of fixed and movable lenses to obtain the required different degrees of magnification. The lens shown has a pair of fixed lenses 28 and 29 and a pair of movable lenses. In the position 30, 31: the said movable lens pair is operative for wide angle application, and in the rear position 32, 33, shown dotted the pair is operative for telephoto application. The two positions are also indicated by the arrowed brackets. A reflex viewfinder arrangement is also incorporated, a portion of the image being extracted by the prism combination 34 and passed to the finder object glass 35 and thence to the light-bending prism arrangement 36 and finder objective 37, 38. To adapt the lens to the purposes of the present invention the prism combination 34 and reflex finder elements 35—38 are removed leaving a space between lenses 29 and 27 which is much larger than in other zoom lenses not of this type. The light-bending device 3 or 3a of the invention is substituted for combination 34 and consequently the objective 27 is no longer used in the position shown, but at right angles thereto.

In the application of the invention to a colour television camera, one or more of the reflecting surfaces involved in the bending of the light path may be a dichroic mirror arranged on a suitable support, e.g. a sheet of glass. In certain circumstances it may be possible to coat one of the surfaces of a prism, where used, with a dichroic mirror surface by any of the techniques known in the art for example sputtering or vacuum deposition or by applying a dichroic mirror surface on a support to the prism face.

It will, therefore, be apparent that the invention has been described only by way of example and that various modifications may be made to the specific details set forth without in any way departing from its scope as defined by the appended claims.

We claim:

1. An optical arrangement comprising, in a single optical system, a zoom lens, and a television pick-up tube, said pick-up tube being arranged off the optical axis of said lens, and light-beam-bending means between the penultimate and final components of said lens and having dimensions sufficient to re-direct substantially all the light passing through the lens, for receiving and transferring the optical image formed by said lens to the screen of said pick-up tube.

2. An optical arrangement comprising, in a single optical system, a zoom lens, and a television pick-up tube, said pick-up tube being arranged off the optical axis of said lens, and light-beam-bending means between the final component of said lens and the focal plane thereof and having dimensions sufficient to re-direct substantially all the light passing through the lens, for receiving and transferring the image formed by said lens onto the screen of said pick-up tube.

3. A television camera comprising a zoom lens and a television pick-up tube, a screen in said pick-up tube, said pick-up tube being arranged off the optical axis of said lens, and light-beam-bending means between the penultimate and final components of said lens and having dimensions sufficient to re-direct substantially all the light passing through the lens, for receiving and transferring the optical image formed by said lens to the screen of said pick-up tube.

4. A television camera comprising a zoom lens, and a television pick-up tube, a screen on said television pick-up tube, said pick-up tube being arranged off the optical axis of said lens, and light-beam-bending means between the final component of said lens and the focal plane thereof and having dimensions sufficient to re-direct substantially all the light passing through the lens, to receive and transfer the image formed by said lens onto said screen.

5. An optical arrangement comprising a zoom lens, and a television pick-up tube, said pick-up tube being arranged off the optical axis of said lens, and reflecting surface means between the penultimate and final components of said lens and having dimensions sufficient to re-direct substantially all the light passing through the lens, for receiving and transferring the optical image formed by said lens to the screen of said pick-up tube.

6. An optical arrangement comprising a zoom lens, and a television pick-up tube, said pick-up tube being arranged off the optical axis of said lens, and reflecting surface means between the final component of said lens and the focal plane thereof and having dimensions sufficient to re-direct substantially all the light passing through the lens for receiving and transferring the image formed by said lens onto the screen of said pick-up tube.

7. An optical arrangement comprising a zoom lens, and a television pick-up tube, said pick-up tube being arranged off the optical axis of said lens, and prism means between the penultimate and final components of said lens and having dimensions sufficient to re-direct substantially all the light passing through the lens, for receiving and transferring the optical image formed by said lens to the screen of said pick-up tube.

8. An optical arrangement comprising a zoom lens, and a television pick-up tube, said pick-up tube being arranged off the optical axis of said lens, and prism means between the final component of said lens and the focal plane thereof and having dimensions sufficient to re-direct substantially all the light passing through the lens, for receiving and transferring the image formed by said lens onto the screen of said pick-up tube.

9. A television camera comprising a zoom lens, and a television pick-up tube, a screen in said pick-up tube, said pick-up tube being arranged off the optical axis of said lens, and reflecting surface means between the penultimate and final components of said lens and having dimensions sufficient to re-direct substantially all the light passing through the lens, for receiving and transferring the optical image formed by said lens onto said screen.

10. A television camera comprising a zoom lens, and a television pick-up tube, a screen on said television pick-up tube, said pick-up tube being arranged off the optical axis of said lens, and reflecting surface means between the final component of said lens and the focal plane thereof and having dimensions sufficient to re-direct substantially all the light passing through the lens, to receive and transfer the image formed by said lens onto said screen.

11. A television camera comprising a zoom lens, and a television pick-up tube, a screen in said pick-up tube, said pick-up tube being arranged off the optical axis of said lens, and prism means between the penultimate and final components of said lens and having dimensions sufficient to re-direct substantially all the light passing through the lens, for receiving and transferring the image formed by said lens onto said screen.

12. A television camera comprising a zoom lens, and a television pick-up tube, a screen in said television pick-up tube, said pick-up tube being arranged off the optical axis of said lens, and prism means between the final component of said lens and the focal plane thereof and having dimensions sufficient to re-direct substantially all the light passing through the lens, to receive and transfer the image formed by said lens onto said screen.

13. An optical arrangement comprising a zoom lens, and a television pick-up tube, said pick-up tube being arranged off the optical axis of said lens, and reflecting surface means including a dichroic mirror between the penultimate and final components of said lens and having dimensions sufficient to re-direct substantially all the light passing through the lens, for receiving and transferring the optical image formed by said lens onto the screen of said pick-up tube.

14. An optical arrangement comprising a zoom lens, and a television pick-up tube, said pick-up tube being arranged off the optical axis of said lens, and prism means having a reflective surface formed as a dichroic mirror between the final component of said lens and the focal plane thereof and having dimensions sufficient to re-direct substantially all the light passing through the lens, for receiving and transferring selected colour components of the image formed by said lens onto the screen of said pick-up tube.

References Cited in the file of this patent

UNITED STATES PATENTS

| | | |
|---|---|---|
| 2,165,341 | Capstaff | July 11, 1939 |
| 2,209,532 | Michel | July 30, 1940 |
| 2,454,686 | Back | Nov. 23, 1948 |
| 2,481,082 | Chew | Sept. 6, 1949 |
| 2,572,729 | Jackson et al. | Oct. 23, 1951 |
| 2,709,391 | Reeves | May 31, 1955 |
| 2,718,817 | Back | Sept. 27, 1955 |
| 2,732,763 | Back | Jan. 31, 1956 |
| 2,772,600 | Walker | Dec. 4, 1956 |
| 2,881,660 | Deterding et al. | Apr. 14, 1959 |

OTHER REFERENCES

Television Engineering Handbook, Fink; McGraw-Hill Book Company, Inc., New York, 1957 (TK 6642 F5).